United States Patent
Henriksson et al.

(10) Patent No.: US 11,364,630 B2
(45) Date of Patent: Jun. 21, 2022

(54) METHOD FOR CONTROLLING AN INDUSTRIAL ROBOT DURING LEAD-THROUGH PROGRAMMING OF THE ROBOT AND AN INDUSTRIAL ROBOT

(71) Applicant: ABB Schweiz AG, Baden (CH)

(72) Inventors: Adam Henriksson, Stockholm (SE); Alvaro Aranda Munoz, Västerås (SE); Elina Vartiainen, Västerås (SE); Jonatan Blom, Sundbyberg (SE); Maria Ralph, Toronto (CA)

(73) Assignee: ABB Schweiz AG, Baden (CH)

( * ) Notice: Subject to any disclaimer, the term of this patent is extended or adjusted under 35 U.S.C. 154(b) by 275 days.

(21) Appl. No.: 16/482,600

(22) PCT Filed: Feb. 17, 2017

(86) PCT No.: PCT/EP2017/053671
§ 371 (c)(1),
(2) Date: Jul. 31, 2019

(87) PCT Pub. No.: WO2018/149502
PCT Pub. Date: Aug. 23, 2018

(65) Prior Publication Data
US 2020/0009730 A1   Jan. 9, 2020

(51) Int. Cl.
*B25J 9/16* (2006.01)
*G05B 19/423* (2006.01)

(52) U.S. Cl.
CPC .............. *B25J 9/1664* (2013.01); *B25J 9/163* (2013.01); *G05B 19/423* (2013.01); *G05B 2219/50391* (2013.01)

(58) Field of Classification Search
CPC ... B25J 9/16; B25J 9/1664; B25J 9/163; B25J 9/1656; G05B 19/42; G05B 19/423;
(Continued)

(56) References Cited

U.S. PATENT DOCUMENTS 5,341,458 A * 8/1994 Kaneko ................ G05B 19/425
                                                        318/568.13
9,339,934 B2   5/2016 Kogan
(Continued)

FOREIGN PATENT DOCUMENTS

EP          2000872 A2    12/2008
WO      2010049101 A1     5/2010
(Continued)

OTHER PUBLICATIONS

International Preliminary Report on Patentability Application No. PCT/EP2017/053671 Completed: May 17, 2019; dated May 17, 2019 14 pages.

(Continued)

*Primary Examiner* — Khoi H Tran
*Assistant Examiner* — Sarah A Tran
(74) *Attorney, Agent, or Firm* — Whitmyer IP Group LLC (57) ABSTRACT

An industrial robot having a manipulator and a robot controller configured to control the motions of the manipulator. The robot controller is configured during lead-through programming of the robot to compare a robot position or a robot orientation (TCP) with at least one virtual position or virtual orientation defined in space, and to actively control the motions of the robot in relation to the at least one virtual position or virtual orientation when the difference between the robot position or robot orientation and the least one virtual position or virtual orientation is smaller than an offset value.

12 Claims, 4 Drawing Sheets

(58) Field of Classification Search
CPC ...... G05B 2219/50; G05B 2219/50391; G05B 2219/36; G05B 2219/36432
USPC ........................................................ 700/253
See application file for complete search history.

(56) References Cited

U.S. PATENT DOCUMENTS

| | | | |
|---|---|---|---|
| 10,579,045 B2* | 3/2020 | Gombert | B25J 13/025 |
| 2005/0222714 A1 | 10/2005 | Nihei et al. | |
| 2015/0081098 A1 | 3/2015 | Kogan | |
| 2015/0217445 A1* | 8/2015 | Hietmann | B25J 9/1656 |
| | | | 700/264 |
| 2017/0266816 A1* | 9/2017 | Takeuchi | B25J 9/1633 |

FOREIGN PATENT DOCUMENTS

| | | |
|---|---|---|
| WO | 2010088959 A1 | 8/2010 |
| WO | 2015113757 A1 | 8/2015 |

OTHER PUBLICATIONS

International Search Report and Written Opinion of the International Searching Authority Application No. PCT/EP2017/053671 Completed: Oct. 13, 2017; dated Oct. 23, 2017 10 pages.

* cited by examiner

METHOD FOR CONTROLLING AN INDUSTRIAL ROBOT DURING LEAD-THROUGH PROGRAMMING OF THE ROBOT AND AN INDUSTRIAL ROBOT

TECHNICAL FIELD

The present invention relates to a method for controlling an industrial robot during lead-through programming of the robot, and an industrial robot.

BACKGROUND

An industrial robot includes a mechanical structure, also denoted as a manipulator, and a robot controller controlling the motions of the manipulator. The manipulator has a plurality of arm parts that are movable in relation to each other about a plurality of joints. At least one of the arm parts is adapted to support a tool. Most robots have the ability to rotate the tool about three orthogonal axes, and by that to align the tool with any desired axis in the surroundings of the robot.

There exist several methods to program industrial robots to perform a task. The traditional way to program a robot is by scripting in high-level programming languages. This yields maximum flexibility, but requires previous expertise and experience. The programming of the robot can, for example, be done by teaching the robot the movements needed to perform the task by moving the robot along a desired operating path while recording the movements of the robot. The operating path includes a sequence of target points, which define the operating path that the robot shall follow at run-time. During the teaching, the robot is guided through the various target points along the operating path, and the position and orientation of the robot in the target points are stored in a memory of the robot. The target points could be taught by a number of methods. A method, referred to as guiding or lead-through programming, enables the user to physically lead an arm of the robot to specific points and to record the motion using a graphical user interface. During the lead-through programming, the user manually moves the robot arm with the tool using his hands. The method makes it possible for non-programmers to control and program robots. However, it still lacks many of the capabilities of traditional robot programming.

During lead-through programming, it is desired to make the robot compliant in one or more directions to enable a user to move the robot by hand to a desired position.

WO2010/088959 discloses a method for programming an industrial robot by lead-through. The robot controller is switched into a floating control mode before the programming begins. The robot is programmed by means of lead-through at the same time as the robot controller is in the floating control mode. When the robot is in the floating control mode, the stiffness of the manipulator is reduced in one or more Cartesian directions and orientations. By switching the robot into the floating control mode the manipulator is made compliant and easy to move by hand. The stiffness is reduced so that the manipulator becomes compliant, but not resilient. When the robot is in the floating control mode, it is easy for the user to move the robot by pushing or pulling the robot to a desired position, and when the user stops the movement, the manipulator will stay in the desired position, since there is no resilience in the floating control mode.

During lead-through programming, the robot controller usually is passively controlled. When the robot is passively controlled, the stiffness of the manipulator is reduced in all Cartesian directions and orientations and by that the manipulator is made fully compliant. With fully compliant is meant that the manipulator is made compliant in all possible directions and orientations, which enables the user to lead the robot arm around freely in any direction and orientation. Further, the manipulator will stay in the desired position when the user stops the movement of the robot arm during passive lead-through. This is accomplished by controlling the robot to compensate for gravity forces acting on the robot arm. A passively controlled robot makes it easy and fast for the user to program large and sweeping motions during lead-through programming. When the user needs the robot to make large sweeping motions he grasps the robot arm firmly and leads the arm freely to the desired position. A disadvantage with the passive control of the robot during lead-through programming is that it is difficult to program more precise movements, such as linear movements.

This problem can be solved by actively controlling the movements of the robot during lead-through programming. For example, the movements of the robot can be restricted so that the manipulator only moves in one direction.

US2015/0081098 discloses a method for active lead-through programming of a robot having a force sensor. The sensor detects a guidance force applied to the robot arm by an operator. The movements of the robot are controlled using force control in such manner that a pre-specified reference point associated with the robot arm is moved only in a selected direction as a result of movement of the robot arm by the operator, during manually-guided adjustment of the position and orientation of the robot arm. This method is suitable for programming linear movements.

When programming an industrial robot the user requires the robot to be both fast and precise. These criteria can be easily met during traditional programming of the robot using coded commands, as the user can type the exact position and determined speeds. However, when using lead-through programming it can be difficult to be fast as well as precise.

WO2015113757A1 discloses actively controlling motions of a robot in relation to virtual positions.

SUMMARY

It is an object of the present invention to at least partly overcome the above problems, and to facilitate lead-through programming of an industrial robot.

According to a first aspect of the invention, this object is achieved by a method for controlling an industrial robot during lead-through programming, as defined in the invention.

The method comprises generating at least one virtual position or virtual orientation in space. The method further comprises during lead-through programming of the robot:
  comparing a robot position or a robot orientation with the respective virtual position or virtual orientation, and
  actively controlling the motions of the robot in relation to the at least one virtual position or virtual orientation when the difference between the robot position or robot orientation and the at least one virtual position or virtual orientation is smaller than an offset value.

With the robot position or robot orientation is meant the position or orientation of a pre-specified reference point associated with the robot. The reference point can be defined in six degrees of freedom, e.g. three positional coordinates and three angle coordinates, or in three degrees of freedom, e.g. three positional coordinates. In a preferred embodiment, the robot position and robot orientation are the position and orientation of a Tool Center Point (TCP) of the robot.

For example, the virtual position or virtual orientation is generated by means of a 3D geometrical formula, and the method comprises defining a 3D geometrical formula that generates at least one virtual position or virtual orientation in space. The 3D geometrical formula generates either one or more virtual positions in space or one or more virtual orientations in space. The at least one virtual position should be located within reach of the robot, i.e. within the working range of the robot. If more than one virtual position is generated, at least some of the virtual positions should be located within the working range of the robot. With a virtual position is meant a position of a virtual (non-physical) element for example a point, a line, or a plane, defined in space in a selected coordinate frame. With a virtual orientation is meant an angle defined in space in a selected coordinate frame.

The offset value specifies an offset to the virtual position or virtual orientation. When a virtual position is generated, the offset value is a specified distance, for example 50 mm. When a virtual orientation is generated, the offset value is a specified angle, for example 5°. The offset value is different from zero. The offset value defines a 3D volume having a boundary surrounding the virtual position or virtual orientation. When the pre-specified reference point of the robot crosses this boundary, i.e. when the difference between the robot position and the virtual position is less than the offset value, or when the difference between robot orientation and the virtual orientation is less than the offset value, the motions of the robot are actively controlled.

With active control is meant that the robot controller controls the motions of the robot in a predefined way in relation to the at least one virtual position or virtual orientation. Thus, the robot controller at least partly takes over the control of the movements of the robot from the user when the robot position or robot orientation is close to the virtual position or virtual orientation, i.e. when the robot position or robot orientation is within the boundary defined by the offset value and the virtual position or virtual orientation. Thus, the user is guided in space during the lead-through programming of the robot, which makes it easier for the user to move the robot to a specific position or orientation during the programming of the robot.

The robot can be actively controlled in many different ways. The robot controller can be configured to completely take over the control of the robot motions from the user when the pre-specified reference point enters the boundary defined by the offset value and the virtual position or virtual orientation. For example, the robot can be controlled so that the reference point of the robot is snapped to the virtual position or virtual orientation when the difference between the robot position or robot orientation and the virtual position or virtual orientation is less than the offset value. The robot controller can also be configured to only partly take over the control of the robot motions from the user when the reference point of the robot crosses the boundary defined by the offset value and the virtual position or virtual orientation. In this case the user can still control the movements of the reference point of the robot, but the user gets a haptic feedback when the robot is in the vicinity of the virtual position or virtual orientation, which tactilely guides the user during programming of the robot. For example, the robot can be controlled so that the reference point of the robot is attracted to or repelled from the virtual position or virtual orientation when the difference between the robot position or robot orientation and the virtual position or virtual orientation is less than the offset value.

In another embodiment of the invention, the robot is controlled so that the velocity of the robot is reduced when the difference between the robot position or robot orientation and the virtual position or virtual orientation is less than the offset value. The robot controller is then configured to actively brake the robot when the reference point of the robot is close to the virtual position or virtual orientation. This embodiment facilitates for the user to hit a desired position or orientation.

Preferably, the motions of the robot are passively controlled when the difference between the robot position or robot orientation and the least one virtual position or virtual orientation is larger than the offset value. The user is then in charge of the control of the robot motions when the robot position or robot orientation is outside the boundary defined by the offset value. Thus, the robot motions are actively controlled when the reference point of the robot is within the offset of the virtual position or orientation, and robot motions are passively controlled when the reference point of the robot is outside the offset of the virtual position or orientation. For example, the robot is fully compliant as long as the reference point of the robot is outside the boundary defined by the offset value, but the reference point of the robot is snapped to the virtual position or orientation, when the reference point of the robot enters the boundary defined by the offset value. This enables both large and sweeping motions as well as more precise motions of the robot during lead-through programming.

With passively controlled is meant that the robot is controlled so that the stiffness of the manipulator is reduced in three Cartesian directions and orientations so that the manipulator becomes fully compliant, which enables the user to lead the robot arm around freely in any direction and orientation. Thus, when the robot is passively controlled it is easy for the user to move the robot tool, by pushing or pulling the robot, to a desired position, and when the user stops the movement the manipulator will stay in the desired position and orientation. By Cartesian directions of the manipulator are meant linear directions in a linear coordinate frame defined with respect to the manipulator, for example, a tool coordinate frame or a work object coordinate frame. By Cartesian orientations are meant the orientations of the axes in the linear coordinate frame.

According to an embodiment of the invention, the 3D geometrical formula generates a plurality of virtual positions or virtual orientations regularly occurring in space, and the method comprises comparing the robot position or robot orientation with the respective virtual positions or virtual orientations, and actively controlling the motions of the robot in relation to the closest of the virtual positions or virtual orientations when the difference between the robot position or robot orientation and the closest of the virtual positions or virtual orientations is less than the offset value.

The 3D geometrical formula may generate a plurality of equidistance positions in space, or a plurality of specified angles with a fixed angular spacing. The offset value defines boundaries surrounding each of the virtual positions or virtual orientations. When the pre-specified reference point of the robot crosses the boundary of any of the virtual positions or virtual orientations, i.e. when the difference between the robot position and one of the virtual positions is less than the offset value, or when the difference between the robot orientation and one of the virtual orientations is less than the offset value, the motions of the robot are actively controlled in relation to this virtual position or virtual orientation. This embodiment provides guiding of the user in space during lead-through programming of the robot, and thus facilitates programming of linear movements, precise positions and precise orientations.

Preferably, the motions of the robot are passively controlled when the differences between the robot position or robot orientation and the virtual positions or virtual orientations are larger than said offset value. Thus, the user is allowed to move the robot in large and sweeping movements when the pre-specified reference point of the robot is outside the boundaries defined by the offset value and the virtual positions or virtual orientations, and guides the user to perform more precise movements when the pre-specified reference point of the robot is inside the boundaries defined by the offset value and the virtual positions or virtual orientations. This embodiment enables programming of both large and sweeping motions as well as more precise motions.

According to an embodiment of the invention, the robot is controlled to snap the robot position or robot orientation to the closest of the virtual positions or virtual orientations if the difference between the robot position or robot orientation and the closest virtual positions or orientations is less than the offset value. This embodiment enables an active lead-through with snap functionality. Essentially, the robot is fully compliant, but the robot is configured to snap to virtual positions or orientations defined in space. The 3D graphical formula may define linear grids, planes or even paths. Grids can be setup with a preferred spacing, for example every 10 mm, 50 mm or 100 mm. The robot can also be configured to snap the reference point of the robot to specified angles, for example, to snap every 10°.

According to an embodiment of the invention, said 3D geometrical formula defines a geometrical pattern in space, and the pattern comprises any of points, lines, planes, circles and spheres. The pattern then defines virtual positions or virtual orientations in space.

According to an embodiment of the invention, the virtual 3D geometrical formula defines a 3D grid including a plurality of elements having virtual positions in space. The robot position is compared with virtual positions of the elements, the motions of the robot are actively controlled to move the robot position in relation to the virtual position of the closest element when the difference between the robot position and the virtual position of the closest element is less than said offset value. The offset value is a distance between the robot position and the elements in the grid. For example, the robot can be controlled so that the reference point of the robot is snapped to the virtual position of the closest element in the grid when the difference between the robot position and the closest virtual position is less than the offset value. The elements of the grid comprise lines in the grid and/or intersection points between lines in the grid. The robot position is compared with the positions of the elements, i.e. the positions of the lines and/or intersection points in the grid. For example, the grid includes a plurality of vertical and horizontal lines, and the robot is controlled so that the reference point of the robot follows vertical and horizontal lines when the reference point of the robot is within the offset of the lines. This embodiment facilitates for the user to program linear movements in three orthogonal directions since the user is guided by the grid.

According to an embodiment of the invention, the 3D geometrical formula generates a plurality of virtual orientations with a fixed angular spacing, and the method comprises comparing the robot orientation with the virtual orientations, and actively controlling the robot to rotate the reference point of the robot towards the closest of the virtual orientations when the difference between the robot orientation and the closest of the virtual orientations is less than the offset value. For example, the robot can be controlled to snap the reference point of the robot to the closest of the virtual orientations when the difference between the robot orientation and the closest of the virtual orientations is less than the offset value. This embodiment facilitates for the user to program specific angles. For example, the 3D geometrical formula generates angels with a fixed spacing of 5°, and the virtual orientations generated may include 0°, 5°, 10°, 15°, etc. If the user, for example wants to program a tool orientation of 45°, the user rotates the tool until the orientation of the tool is closest to 45°, and then the tool is automatically rotated to exactly 45°.

The method may further comprise: passively controlling the robot when the differences in rotation between the robot orientation and the virtual orientations are larger than the offset value. Thus, the robot is fully compliant when the orientation of reference point of the robot is outside the offset from any of the virtual orientations, which enables the user to carry out large sweeping motions during the lead-through programming of the robot.

The method comprises defining the virtual 3D geometrical formula in a coordinate frame and defining where an origin of the virtual 3D geometrical formula is located in the frame. By defining a frame and the origin of the frame it is possible to compare the robot position or robot orientation with the generated virtual positions and orientations. The virtual 3D geometrical formula should be defined in a coordinate frame with a known relation to a robot coordinate frame. The coordinate frame can be any of a world coordinate frame, a robot coordinate frame, a tool coordinate frame, or other predefined coordinate frames. The relation between the robot and the defined coordinate frame must be known. For example, the robot and the virtual 3D geometrical formula can be defined in the same coordinate frame.

According to a second aspect of the invention, this object is achieved by an industrial robot, as defined in the invention.

The industrial robot comprises a manipulator and a robot controller configured to control the motions of the manipulator. The robot controller is configured during lead-through programming of the robot to compare a robot position or a robot orientation with the at least one virtual position or virtual orientation defined in space, and to actively control the motions of the robot in relation to the at least one virtual position or virtual orientation when the difference between the robot position or robot orientation and the least one virtual position or virtual orientation is less than an offset value. The invention makes it easier for the user to move the robot to a specific position or orientation during lead-through programming of the robot.

According to an embodiment of the invention, the robot controller is configured to automatically switch between active and passive control of the motions of the robot during lead-through programming of the robot, and the robot controller is configured to passively control the motions of the robot when the differences between the robot position or robot orientation and the virtual positions or virtual orientations is larger than said offset value.

According to an embodiment of the invention, the robot controller is configured to upon command switch between a passive lead-through mode in which the robot is fully compliant and a combined lead-through mode in which the robot can be passively or actively controlled in dependence on said difference between the robot position or robot orientation and the at least one virtual position or virtual orientation and an offset value. This embodiment makes it possible for the user to switch between having the robot fully compliant without any guiding of the robot motions, and having the robot fully compliant with partial guiding of the robot motions during the lead-through programming.

According to an embodiment of the invention, the robot controller is configured to control the motions of the robot so that the robot position or robot orientation is attracted to or repelled from the at least one virtual position or virtual orientation when the difference between the robot position or robot orientation and the virtual position or virtual orientation is less than said offset value.

According to an embodiment of the invention, a plurality of virtual positions or virtual orientations regularly occurring in space is defined, and the robot controller is configured to compare the robot position or robot orientation with the respective virtual positions or virtual orientations, and to actively controlling the motions of the robot in relation to the closest of the virtual positions or virtual orientations when the difference between the robot position or robot orientation and the closest of the virtual positions or virtual orientations is less than said offset value.

According to an embodiment of the invention, said virtual 3D geometrical formula defines a grid including a plurality of elements having virtual positions in space, and the robot controller is configured to compare the robot position with virtual positions of the elements in the grid, and to move the robot position in relation to the virtual position of the closest element in the grid when the difference between the robot position and position of the closest element in the grid is less than said offset value. The offset value is a distance between the robot position and the elements in the grid.

BRIEF DESCRIPTION OF THE DRAWINGS

The invention will now be explained more closely by the description of different embodiments of the invention and with reference to the appended figures.

DETAILED DESCRIPTION

Figure 1:
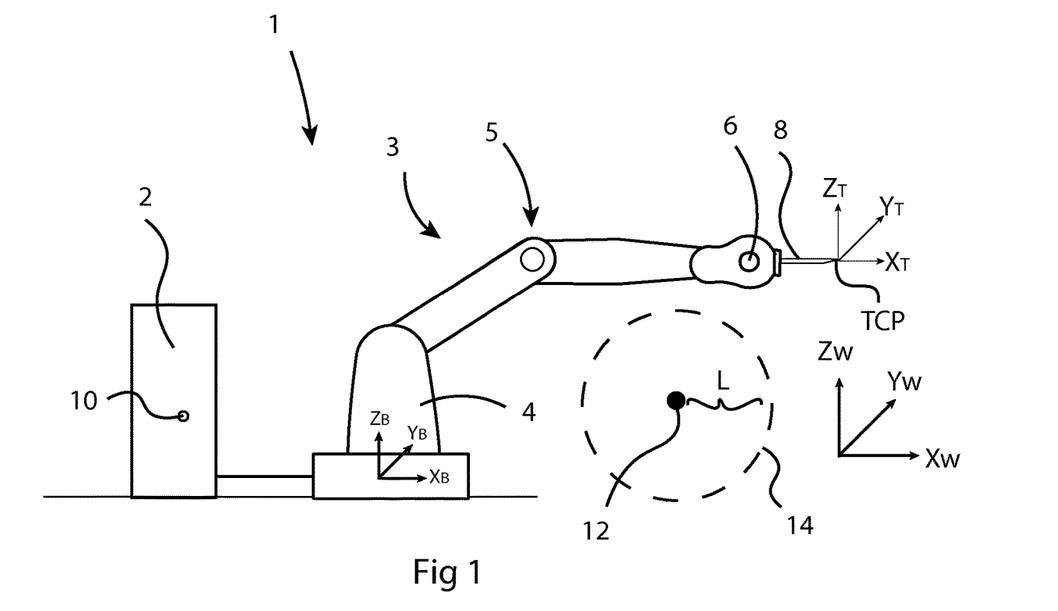
FIG. 1 shows an example of an industrial robot according to the invention and a virtual position defined in the working range of the robot.

FIG. 1 shows an example of an industrial robot 1 according to the invention. The robot 1 comprises a robot controller 2 and a manipulator 3. The manipulator 3 comprises a plurality of parts that are movable in relation to each other about a plurality of joints under the control of the robot controller 2. In this example, the manipulator 3 has a stationary base 4, an arm 5 that is rotatable about the stationary base and supports a wrist 6 that is rotatable about a plurality of joints. The wrist 6 supports a tool 8, in which an operating point, called "Tool Center Point" (TCP), is defined. The TCP is defined in six degrees of freedom: three positional coordinates and three angle coordinates. The position and orientation of the TCP are given by the positions of the joints of the robot, and can be calculated based on signals from the position sensors of the robot. Optionally, the manipulator can be equipped with a force sensor for providing information to the controller about a desired movement direction during lead-through programming. The robot can also be a dual arm robot.

The robot controller 2 includes software as well as hardware, such as input and output means, a processor unit including one or more central processing units (CPU) for handling main functions of the robot controller, such as executing robot programs. The controller has a storage medium for storing data, software and program code for controlling the movements of the manipulator. The movements of the joints are driven by motors. The positions of the joints are controlled by the robot controller 2. The joints are equipped with position sensors, for example angle-measuring devices, to provide position feedback to the robot controller 2.

The robot may have a plurality of defined coordinate frames. A tool coordinate frame $X_T, Y_T, Z_T$ is defined for the tool. If the tool is elongated, the Z-axis of the tool coordinate frame is usually defined along a length axis of the tool. The origin of the tool coordinate frame is located in the TCP. A robot base coordinate frame $X_B, Y_B, Z_B$ is usually defined in the stationary base 4 of the robot. The relation between the tool coordinate frame and the base coordinate frame is known. The position and orientation of the TCP can be determined in the base coordinate frame of the robot based on the position feedback from the position sensors and the known relation between the tool coordinate frame and the base coordinate frame. A world coordinate frame $X_W, Y_W, Z_W$ is defined somewhere in the surroundings of the robot. With a world coordinate frame is meant a coordinate frame defined in relation to a fixed point in the surroundings of the robot. The $Z_W$-axis of the world coordinate frame is commonly aligned with the vertical line. The relation between the world coordinate frame and the base coordinate frame is known. Thus, it is possible to determine the position and orientation of the TCP in the world coordinate frame. In some applications, the world coordinate frame coincides with the base coordinate frame of the robot.

The robot is configured to switch between two or more control modes in which the motions of the robot are differently controlled. There is at least one control mode to be used during normal operation of the robot and at least one control mode to be used during lead-though programming of the robot. During normal operation of the robot, the robot motions are controlled in accordance with a robot control program, and the manipulator should be stiff to prevent the robot from being moved by pushing or pulling the manipulator. During lead-through programming, the stiffness of the robot should be reduced to allow the user to move the robot arm using his hands. For example, the robot controller can be configured to switch to a passive lead-through mode in which the robot is controlled so that the manipulator has a reduced stiffness in all axes, and in all tool directions and orientations, i.e. the manipulator is fully compliant. According to the invention, the robot controller is configured to upon command switch a combined lead-through mode in which the robot can be both passively and actively controlled in dependence on the relation between the position or orientation of a reference point of the robot and at least one virtual position 12 or virtual orientation defined in space.

In the embodiment shown in FIG. 1, the robot is provided with a switch 10 configured to be operated by a user for switching the robot controller between the different control modes. In this embodiment the switch 10 is arranged on the robot controller 2 in the form of a pushbutton. Alternatively, the switch 10 may be provided on a teach pendant unit (TPU). Alternatively, the switch 10 can be a soft button displayed on a display unit, or as an alternative on a menu displayed on the display unit. When the robot controller 2 is switched to a position control mode, the robot controller is configured to control the robot so that the manipulator is stiff in all axes, and in all tool directions and orientations. The position control mode is the default mode used during normal operation of the robot. When the robot controller is switched to a passive lead-through control mode, the robot controller is configured to control the robot so that the manipulator has a reduced stiffness in all axes, and in all tool directions and orientations. The passive lead-through control mode is optional. If there is more than one lead-through control mode, the robot motions during lead-through programming depend on which lead-through control mode is selected.

Figure 2:
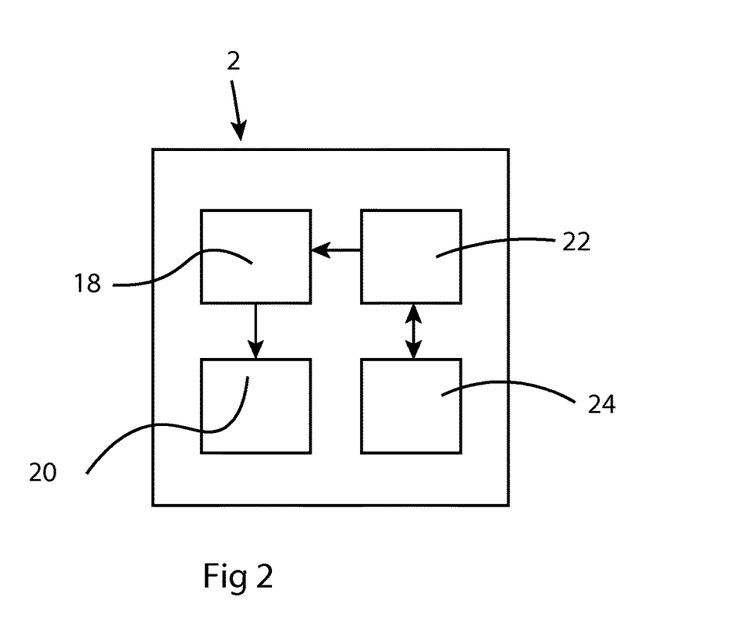
FIG. 2 shows a block diagram illustrating relevant parts of the robot controller.

FIG. 2 shows a block diagram illustrating the parts of the robot controller 2 relevant for the invention. The robot controller 2 comprises a servo control unit 18 including one servo controller for each axis. The servo control unit 18 comprises a position controller, in the form of a position loop, configured to calculate a position error based on the difference between a reference position and a measured position from the motor. The position error is multiplied by a value, which is denoted by the position control gain. The position control gain is variable. A high value of the position control gain makes the axis controlled by the servo motor stiff, and a low value of the position control gain makes the axis controlled by the servo motor compliant. Further, the servo control unit 18 is provided with a speed controller including a speed loop configured to calculate a torque reference for the motor based on a speed error. The speed error is calculated as the difference between a measured speed and a speed reference from the speed controller. The speed control loop has a speed control gain, and the speed error is multiplied by the speed control gain. The speed control gain is variable. When the gains of the speed loops are high the manipulator is slow to move. By reducing the gain of the speed loops it becomes easier to move the manipulator. When the robot is in the passive lead-through control mode, the position control gain is set to zero or close to zero, and the speed control gain is significantly reduced. When the robot is actively controlled during the lead-through programming, the position control gain and the speed control gain are reduced so that the robot is still compliant, or at least partly compliant.

The servo control unit 18 also includes a torque control loop. In the torque control loop a torque control signal is generated by adding a torque feed-forward signal to a torque reference from the speed controller. The torque control signal is transferred to a drive unit 20 configured to provide the motors with current in dependence on the torque control signal. The torque feed-forward signal provides compensation for the gravitational force acting on the manipulator. The servo controller is configured to provide compensation for the gravitational force acting on the manipulator during the active as well as the passive control of the robot. During the passive lead-through control of the robot, the robot controller provides compensation for the gravitational force acting on the manipulator so that the robot will stay in the current position and orientation when the user releases his hands from the robot.

The robot controller is further provided with a computing unit 22. The computing unit 22 is configured to calculate the position control gain, the speed control gain, and the torque feed-forward signal. The computing unit 22 receives a signal from the switch 10 regarding a selected control mode, i.e. whether the robot controller is to be operated in a control mode to be used during normal operation of the robot, or a control mode to be used during lead-though programming of the robot. The computing unit 22 is configured to adjust the position control gain and the speed control gain in accordance with the selected control mode. The computing unit 22 is a software module executed by hardware of the robot controller. The robot controller further comprises a data storage 24.

In the following, the combined lead-through control mode in which the robot can be both passively or actively controlled will be described in more details. When the robot is switched to the combined lead-through control mode, the computing unit 22 of the robot controller 2 is configured to compare the position or orientation of the reference point of the robot with at least one virtual position or virtual orientation defined in space. Information on predefined virtual positions and/or virtual orientations is stored in the data storage 24. The at least one virtual position or virtual orientation is defined in a coordinate frame. In this embodiment, the reference point is the TCP of the robot and a virtual position 12 is defined in the working range of the robot. In this embodiment, the virtual position 12 is defined in the world coordinate frame $X_W, Y_W, Z_W$.

An offset value L is defined. The offset value is stored in the data storage 24. In this embodiment, the offset value is a distance, for example, 100 mm. The offset value L defines a 3D boundary 14 around the virtual position 12. The computing unit 22 is configured to compute the difference between the position/orientation of the reference point and the virtual position/orientation, and to actively control the motions of the robot in relation to the at least one virtual position or virtual orientation when the difference between the robot position or robot orientation and the at least one virtual position or virtual orientation is less than the offset value, as long as the combined lead-through control mode is selected. Thus, the robot is actively controlled when the TCP is within the boundary 14.

The robot controller can be configured to actively control the robot in relation to one virtual position/virtual orientation in different ways. For example, the robot controller can be configured to control the motions of the robot so that the TCP is attracted to or repelled from the virtual position 12 when the TCP is within the boundary 14. For example, the robot controller can be configured to control the motions of the robot so that the TCP is snapped to the virtual position 12 when the TCP is within the boundary 14. Alternatively, the robot controller can be configured to control the motions of the robot so that the velocity of the robot is reduced when the TCP enters the boundary 14. The robot controller can be configured to start braking the robot when the TCP crosses the boundary 14, and then continue to brake the robot when the TCP is getting closer to the virtual position. Thus, the velocity of the robot is further reduced when the TCP is getting closer to the virtual position. The robot controller actively controls the robot by providing the servo controller with position reference values and speed reference values in dependence on in which way the robot should be actively controlled. In which way the robot motions should be actively controlled can be determined beforehand, or the user may select between different options.

The robot controller 2 is configured to passively control the motions of the robot when the TCP is outside the boundary 14, i.e. when the difference between the position of the TCP and the virtual position is larger than the offset value L. Thus, the robot is controlled so that the manipulator is fully compliant in all directions and orientations when the difference between the position of the TCP and the virtual position is larger than the offset value L. This is accomplished by significantly reducing the position control gain and the speed control gain, while still compensating for gravity forces acting on the manipulator. Thus, the user is enabled to move the robot arm freely outside the boundary 14.

Figure 3:
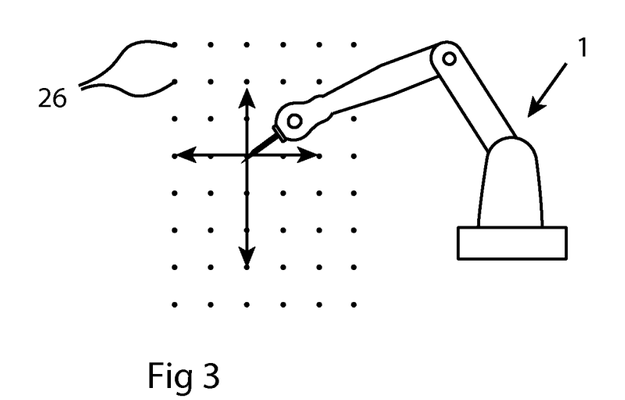
FIG. 3 illustrates an industrial robot and a plurality of virtual positions defined in the working range of the robot.

FIG. 3 illustrates an industrial robot 1 and a plurality of virtual positions 26 defined in the working range of the robot. Only some of the defined virtual positions 26 are shown in the figure. The virtual positions are regularly occurring in space and extend in 3 dimensions. A 3D geometrical formula that generates a plurality of virtual positions in space is defined. The virtual positions 26 are regularly occurring in space with a certain spacing between them. For example, the distance between each pair of neighboring virtual positions is 100 mm. In this embodiment, the virtual positions 26 form a plurality of parallel first rows and columns. The virtual positions 26 form a plurality of second rows orthogonal to the first rows. The rows and columns define linear paths in the space. The virtual positions 26 are stored in the data storage 24. The computing unit 22 of the robot controller is configured to compare the position of the TCP with the virtual positions, and to actively control the motions of the robot in relation to the closest of the virtual positions when the difference between the position of the TCP and the closest of the virtual positions is less than the offset value L. For example, the computing unit 22 can be configured to control the motions of the robot so that the TCP is snapped to, or at least attracted to, the closest of the virtual positions 26 when the difference between the position of the TCP and the closest of the virtual positions is less than the offset value L. Thus, it is easy for the user to follow the paths defined by the rows and columns and by that programming of linear movements is facilitated.

Figure 4:
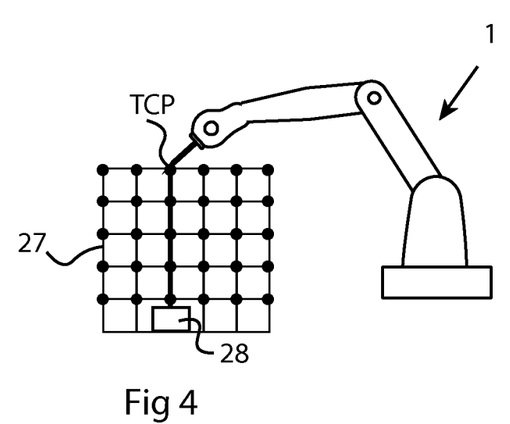
FIG. 4 illustrates an example of how the robot motions are guided during lead-through programming of the robot.

FIG. 4 illustrates an example where a linear grid 27 has been defined, and the user is leading the robot arm along the linear grid during lead-through programming of the robot. Only a part of the grid linear 27 is shown in the figure. The grid is defined in the entire space, and has no beginning and no end. FIG. 4 illustrates how the TCP of the robot 1 is guided along a path defined by the lines in the grid. The robot is to be programmed to do a perpendicular pick-and-place task, including to perform a linear movement towards a work object 28. During movements of the robot arm, the TCP of the robot snaps to the closest intersection point in the grid, or to the closest line between the intersection points. Thus, programming linear movements by means of lead-through is facilitated. When the robot programmer needs the robot to make large sweeping motions he grasps the robot arm firmly and leads the arm freely to the target position. If robot programmer requires more precision he can linearly guide the robot arm to the target position along one of the lines in the grid.

Figure 5:
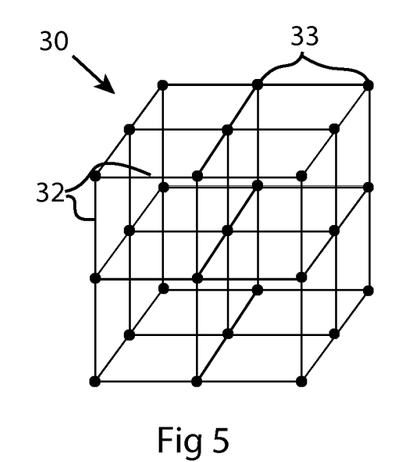
FIG. 5 illustrates an example of a 3D virtual grid having a plurality of lines defining a plurality of virtual positions in space.

FIG. 5 illustrates an example of a 3D virtual grid 30 including a plurality of elements defining a plurality of virtual positions in space. Only a part of the 3D virtual grid 30 is shown in the figure. The grid is defined in the entire space. The 3D virtual grid is, for example, defined in the world coordinate frame or in the robot base coordinate frame. The elements of the grid comprise lines 32 in the grid and intersection points 33 between lines in the grid. The spacing between the lines in the grid can be defined beforehand, or can be set or adjusted by the user. The spacing between the lines in the grid is, for example, 10 mm, 50 mm or 100 mm. The computing unit 22 is configured to compare the robot position, for example the position of the TCP, with the virtual positions of the elements in the grid, and to move the robot position in relation to the virtual position of the closest element in the grid when the difference between the robot position and position of the closest element in the grid is less than the offset value. For example, the robot can be actively controlled so that the defined reference point of the robot is moved towards the closest element in the grid when the difference between the robot position and the closest virtual position is less than the offset value. In one embodiment, the robot can be actively controlled so that the defined reference point of the robot is snapped to the closest line in the grid, when the difference between the robot position and the closest line is less than the offset value.

The offset value is a distance between the defined position point of the robot and the elements in the grid. The robot position is compared with the virtual positions of the elements, i.e. the positions of the lines or intersection points in the grid. This embodiment facilitates for the user to program linear movements in three orthogonal directions since the user is guided by the 3D virtual grid.

Figure 6:
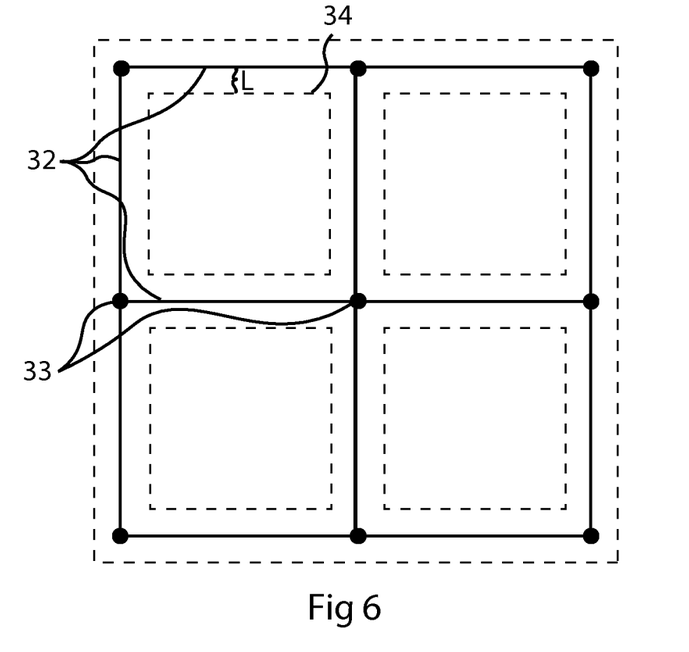
FIG. 6 illustrates boundaries defined around the lines in the grid to differentiate between active and passive control of the robot motions.

FIG. 6 illustrates boundaries 34 surrounding the lines 32 in the 3D virtual grid. The boundaries 34 differentiate between active and passive control of the robot motions. The offset value L should be less than half of the distance between the lines in the grid. For example, the distance between the lines in the grid is 100 mm and the offset value L is 20 mm. The boundaries are defined by the offset value L. In this embodiment, the elements are the lines 32 in the grid, and the robot position (TCP) is compared with the positions of the lines. The motions of the robot are actively controlled when the TCP of the robot is within the boundaries 34. Preferably, the motions of the robot are passively controlled when the difference between the TCP and any of the lines in the grid is larger than the offset value, i.e. when the TCP of the robot is outside the boundaries 34. Thus, the user is in charge of the control of the robot motions when the TCP is outside the boundaries 34 defined by the offset value, and the robot controller is at least partly controlling the motions of the robot when the TCP is inside the boundary 34.

Figure 7:
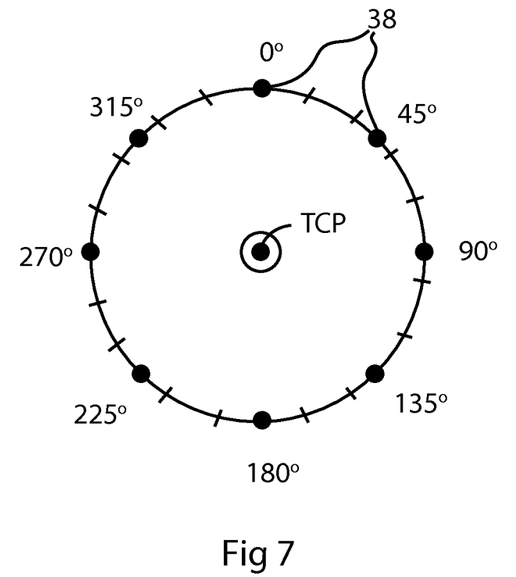
FIG. 7 illustrates an example a plurality of virtual orientations defined in space.

FIG. 7 illustrates an example of a plurality of virtual orientations defined in space. The virtual orientations are angles defined in space with a fixed angular spacing, for example 5°, or 10°. In this example, the virtual orientations are defined in the robot base coordinate frame $X_B$, $Y_B$, $Z_B$. The computing unit 22 is configured to compare the robot orientation, i.e. the orientation of the reference point of the robot, for example the orientation of the TCP which is considered to coincide with the orientation of the tool coordinate frame, with the virtual orientations, and to actively control the robot to rotate the reference point towards the closest of the virtual orientations when the difference between the robot orientation and the closest virtual orientation is less than the offset value. For example, the computing unit 22 is configured to snap the TCP to the angle defined by the closest virtual orientation when the difference between the robot orientation and the closest virtual orientation is less than the offset value.

The offset value is an angle, which can be determined beforehand, or is set or adjusted by the user. Preferably, the offset value is less than half of the angular spacing between the fixed angles, For example, the angular spacing between the fixed angles is 5° and the offset value is 1°.

Figure 8:
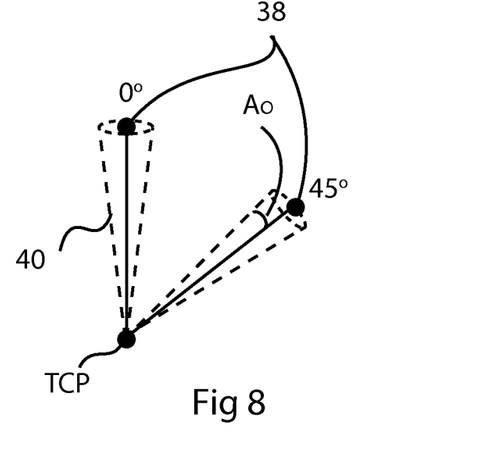
FIG. 8 illustrates boundaries defined around the virtual orientations to differentiate between active and passive control of the robot motions.

FIG. 8 illustrates boundaries 40 surrounding the virtual orientations 38 and defined by an offset value $A_O$ in order to differentiate between active and passive control of the robot motions. Preferably, the computing unit 22 is configured to passively control the robot when the differences in orientation between the robot orientation and the virtual orientations are larger than the offset value, i.e. when the reference point of the robot is outside the boundaries 40, and to actively control the robot when the differences in orientation between the robot orientation and any of the virtual orientations is smaller than the offset value, i.e. when the reference point of the robot is inside the boundaries 40. Thus, the robot is fully compliant when the orientation of reference point of the robot is outside the offset from any of the virtual orientations, which enables the user to carry out large sweeping motions during the lead-through programming of the robot.

Figure 9:
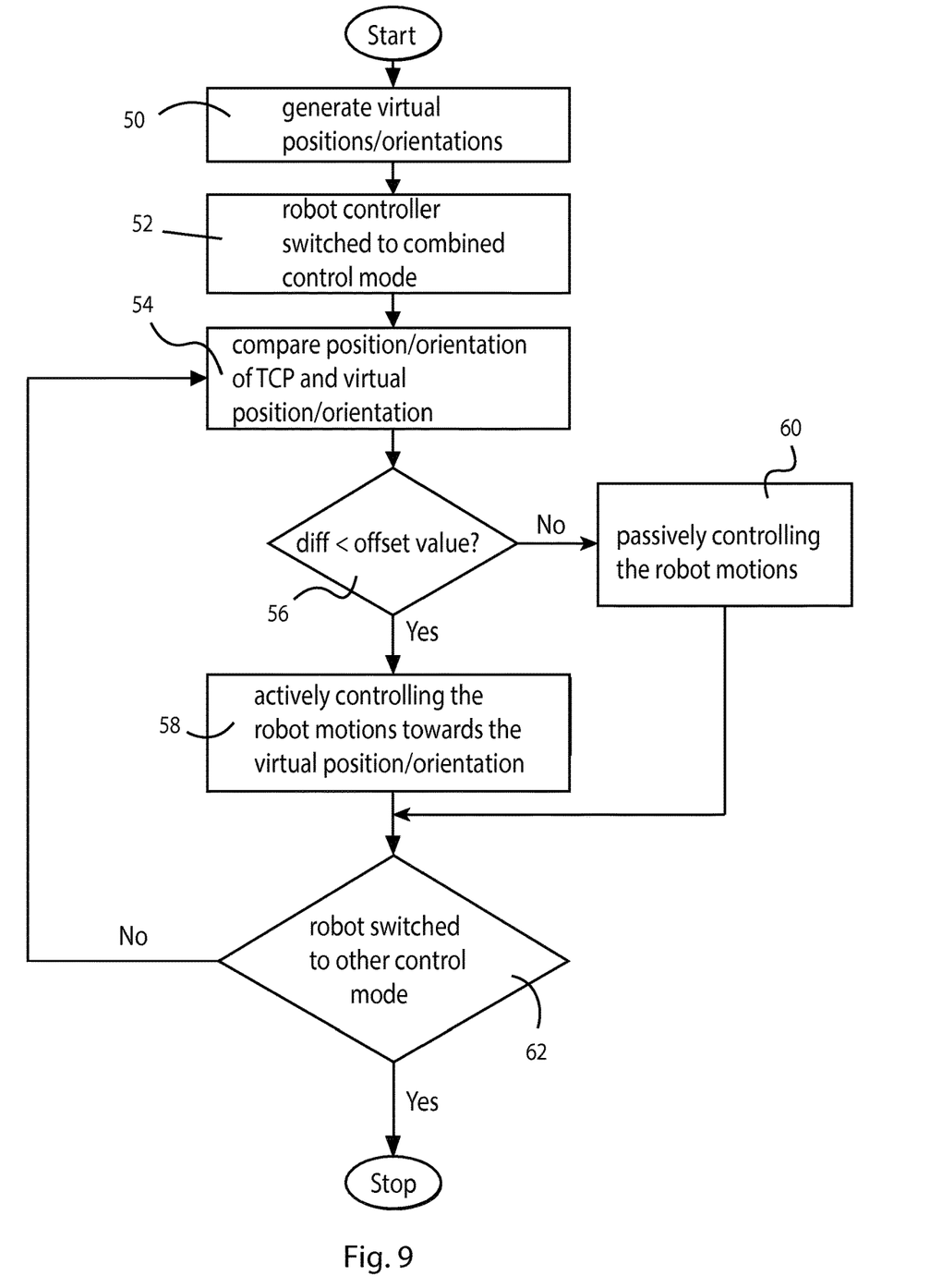
FIG. 9 shows a flow chart illustrating a method for controlling an industrial robot during lead-through programming according to an embodiment of the invention.

FIG. 9 shows a flow chart illustrating a method for controlling an industrial robot during lead-through programming according to an embodiment of the invention. Each of the blocks in the flow chart can be implemented by software including program instructions executed by the robot controller.

In a first step, the method comprises generating at least one virtual position or virtual orientation in space, block 50. If more than one virtual position or virtual orientation are to be generated, a 3D geometrical formula can be used to generate a plurality of virtual positions or virtual orientations regularly occurring in space with a fixed spacing. For example, a 3D geometrical formula defining a grid in space can be used for defining vertical and horizontal lines in the space, and a 3D geometrical formula defining a sphere can be used for generating a plurality of orientations with equal angular distances in space. The virtual positions and/or virtual orientations are generated beforehand and stored in a data storage in the robot controller or accessible by the robot controller. In one embodiment of the invention, only virtual positions are generated, in another embodiment, only virtual orientations are generated, and in a third embodiment virtual positions as well as virtual orientations are generated. An offset value for the virtual position and/or virtual orientation is determined and stored in the data storage. Optionally, the offset value is adjustable during the lead-through programming.

During lead-through programming of the robot the method comprises the following steps. The programmer switches the robot controller to the combined control mode before starting the lead-through programming, block 52. When the user actuates the switch 10 an order is sent to the robot controller 2 to switch the controller to combined control mode. The robot controller receives the switching order. When programming the robot by lead-through the user grasps the tool, or any other suitable part of the manipulator and moves the tool, or a work object held by the robot to a desired position and orientation on a robot path to be programmed. The TCP of the robot is calculated during the movement of the manipulator and the calculated position of the TCP is compared with the stored virtual position/positions or virtual orientation/orientations. In one embodiment of the invention, the position of the TCP is compared with the stored virtual position/positions, and the difference between the position of the TCP and the stored virtual position/positions is calculated, block 54. In another embodiment of the invention, the orientation of the TCP is compared with the stored virtual orientation/orientations, and the difference between the orientation of the TCP and the stored virtual orientation/orientations is calculated, block 54.

The calculated difference is compared with the offset value, block 56. If the difference between the calculated difference is less than the offset value, the motions of the robot are actively controlled, block 58. How the robot is controlled depends on the setup of the active control. In this embodiment, the motions of the robot are controlled so that the orientation of the TCP of the robot is moved towards the closest of the defined virtual orientation/orientations. In an alternative embodiment, the motions of the robot can be controlled so that the orientation of the TCP of the robot is moved away from the closest of the defined virtual orientation/orientations, or the speed of the robot is changed during the active control. If the difference between the calculated difference is larger than the offset value, the motions of the robot are passively controlled, block 60. The value of the position gain is set to zero or close to zero and the speed gain is reduced at least to half of its value compared to the value in the position control mode. Thus, the robot is made fully compliant, i.e. has a reduced stiffness in all axes, directions and/or orientations. The steps 54-62 are repeated until the user switches the robot to another control mode, for example to the position control mode.

The present invention is not limited to the embodiments disclosed but may be varied and modified within the scope of the following claims. For example, other geometrical patterns can be defined in space.

The invention claimed is:

1. A method for controlling an industrial robot during lead-through programming, wherein the method includes generating a virtual orientation in space, wherein the space comprises a working range of the robot, and the method includes during lead-through programming of the robot:
   comparing an orientation of a tool center point (TCP) of the robot with the virtual orientation, and
   actively controlling the motions of the robot in relation to the virtual orientation when the difference between the orientation of the TCP of the robot and the virtual orientation is less than an offset value (Ao).

2. The method according to claim 1, wherein the motions of the robot are actively controlled so that the orientation of the TCP of the robot is attracted to or repelled from the virtual orientation when the difference between the orientation of the TCP of the robot and the virtual orientation is less than said offset value (Ao).

3. The method according to claim 1, wherein the robot is controlled so that the velocity of the robot is reduced when the difference between the orientation of the TCP of the robot and the virtual orientation is less than said offset value (Ao).

4. The method according to claim 1, wherein the motions of the robot are passively controlled when the difference between the orientation of the TCP of the robot and the virtual orientation is larger than said offset value (Ao).

5. The method according to claim 4, wherein the robot is controlled so that the robot is fully compliant when the difference between the orientation of the TCP of the robot and the virtual orientation is larger than said offset value (Ao).

6. The method according to claim 1, wherein the method includes defining a 3D geometrical formula which generates a plurality of virtual orientations regularly occurring in space, and the method includes:
 comparing the orientation of the TCP of the robot with the respective virtual orientations, and
 actively controlling the motions of the robot in relation to the closest of the virtual orientations when the difference between the orientation of the TCP of the robot and the closest of the virtual orientations is smaller than said offset value (Ao).

7. The method according to claim 6, wherein said 3D geometrical formula defines a geometrical pattern in space, and the pattern includes any of points, lines, planes, circles, and spheres.

8. The method according to claim 6, wherein said 3D geometrical formula generates a plurality of virtual orientations with a fixed angular spacing, and the method includes:
 comparing the orientation of the TCP of the robot with the virtual orientations, and
 actively controlling the robot to rotate to the closest virtual orientation when the difference between the orientation of the TCP of the robot and the closest virtual orientation is smaller than said offset value (Ao).

9. An industrial robot comprising a manipulator and a robot controller configured to control the motions of the manipulator, wherein the robot controller is configured during lead-through programming of the robot to compare an orientation of a tool center point (TCP) of the robot with a virtual orientation defined in space, wherein the space comprises a working range of the robot, and to actively control the motions of the robot in relation to the virtual orientation when the difference between the orientation of the TCP of the robot and the virtual orientation is smaller than an offset value (Ao).

10. The industrial robot according to claim 9, wherein the robot controller is configured to automatically switch between active and passive control of the motions of the robot during lead-through programming of the robot, and the robot controller is configured to passively control the motions of the robot when the difference between the orientation of the TCP of the robot and the virtual orientation is larger than said offset value (Ao).

11. The industrial robot according to claim 9, wherein the robot controller is configured to control the motions of the robot so that the orientation of the TCP of the robot is attracted to or repelled from the virtual orientation when the difference between the orientation of the TCP of the robot and the virtual orientation is smaller than said offset value (Ao).

12. The industrial robot according to claim 9, wherein a plurality of virtual orientations regularly occurring in space are defined, and the robot controller is configured to compare the orientation of the TCP of the robot with the respective virtual orientations, and to actively control the motions of the robot in relation to the closest of the virtual orientations when the difference between the orientation of the TCP of the robot and the closest of the virtual orientations is smaller than said offset value (Ao).

* * * * *